United States Patent

Heidemann et al.

Patent Number: 5,499,135
Date of Patent: *Mar. 12, 1996

[54] OPTICAL AMPLIFIER

[75] Inventors: Rolf Heidemann, Tamm; Thomas Pfeiffer, Stuttgart; Manfred Kaiser, Hemmingen, all of Germany

[73] Assignee: Alcatel N.V., Amsterdam, Netherlands

[*] Notice: The term of this patent shall not extend beyond the expiration date of Pat. No. 5,297,154.

[21] Appl. No.: 323,239

[22] Filed: Oct. 14, 1994

Related U.S. Application Data

[63] Continuation of Ser. No. 923,905, Aug. 24, 1992, abandoned.

[30] Foreign Application Priority Data

Dec. 24, 1990 [DE] Germany ............... 40 41 760.3

[51] Int. Cl.⁶ .................... H01S 3/30; G02B 6/26
[52] U.S. Cl. ................ 359/341; 359/345; 372/71
[58] Field of Search ............... 359/134, 160, 359/337, 341, 345; 372/70, 71

[56] References Cited

U.S. PATENT DOCUMENTS 4,847,521  7/1989  Huignard et al. .
5,054,876  10/1991  Grasso et al. .
5,229,876  6/1993  Fatehi et al. .
5,297,154  3/1994  Heidemann et al. .

FOREIGN PATENT DOCUMENTS 0139436  5/1985  European Pat. Off. .
0275768  7/1988  European Pat. Off. .
0442553  8/1991  European Pat. Off. .
0568897  10/1993  European Pat. Off. .
2534889  2/1977  Germany .
61-75326  11/1985  Japan .

*Primary Examiner*—Nelson Moskowitz
*Attorney, Agent, or Firm*—Ware, Fressola, Van Der Sluys & Adolphson

[57] ABSTRACT

Known optical amplifiers, which are used in a light transmission path to amplify the light signals to be transmitted, have the disadvantage that the semiconductor lasers, used as pump lasers therein, are very sensitive to feedback.

According to the invention, the operating current of such pump lasers (4) is modulated at a high frequency, which causes the pump laser to operate in a multi-mode, thereby making it insensitive to feedback. For example, the operating current is DC, on which AC is superimposed.

In the event the optical amplifier has two pump lasers, their operating current is also modulated. Both pump lasers are then advantageously alternately switched on and off at a sufficiently high switching frequency, which also prevents reciprocal interference.

16 Claims, 1 Drawing Sheet

OPTICAL AMPLIFIER

This is a continuation of copending application Ser. No. 07/923,905 filed on Aug. 24, 1992, now abandoned and International Application PCT/EP91/02458 filed on Dec. 19, 1991 and which designated the U.S.

TECHNICAL FIELD

The present invention relates to optical amplifiers, particulary for amplifying light signals for transmission on fiber optical waveguides.

BACKGROUND OF THE INVENTION

Optical amplifiers serve to amplify light signals which are transmitted over a transmission path, in particular a fiber optical waveguide (optical fiber), and are weakened by attenuation so that they must be amplified.

An optical amplifier with a length of fiber that contains a laser-active substance for amplifying light signals, which is coupled to at least one semiconductor laser serving as a pump light source, which is activated by an operating current, is known e.g. from: M. Yoshida et al: "Development of Compact $Er^{3+}$-doped Fiber Amplifiers for Practical Applications", Technical Digest on Optical Amplifiers and their Applications 1990 (Optical Society of America, Washington, DC 1990), Volume 13, pages 282 to 285. It is a fiber amplifier with an erbium-doped length of fiber. Erbium is a laser-active substance, which is excited by a semiconductor laser serving as a pump laser. In this instance, the semiconductor laser emits light at a wavelength of $\lambda=1480$ m. This light is introduced into the doped length of fiber by an optical coupler. Direct current is used as the operating current to control the semiconductor laser.

Instead of a single pump laser, as shown in FIG. 1a of said reference, two pump lasers as shown in FIG. 1c thereof can also be provided, whose pump light is coupled into each end of the length of fiber.

A disadvantage of this optical amplifier is that the pump light produced by the semiconductor laser is reflected back into the semiconductor laser at all points along its propagation path where refractive index skipping occurs (e.g. in the area of the optical coupler or in the transition between the optical fiber and the erbium-doped length of fiber). This degrades the efficiency of the semiconductor laser; the reflected light can cause amplitude fluctuations in the pump light emitted by the semiconductor laser, because the laser-active layer in the semiconductor laser acts as a laser resonator, together with part of the transmission path (i.e. up to the area with the refractive index skip). This changes the emission frequency of the semiconductor laser, on the one hand, and subjects the amplitude of the pump light to oscillations, on the other. In particular, the amplifying effect of the length of fiber is temporarily cancelled when the oscillations occur in the low frequency range, e.g. in the kilohertz range; this can interrupt the optical transmission, under certain circumstances.

In the event two pump lasers are present (semiconductor lasers in each instance), the described problem exists for each of the two pump lasers. Furthermore, in that case there is the problem of residual pump light from each pump laser entering the opposite pump laser, which causes optical instabilities, which in turn lead to the above described problems of fluctuations in amplification. For that reason, optical isolators are presently used before the pump lasers.

SUMMARY OF THE INVENTION

It is the task of the present invention to produce an optical amplifier with one pump laser or two pump lasers, which ensures interference-free amplification of the light signals.

The task is fulfilled by an optical amplifier with a length of fiber that contains a laser-active substance for amplifying light signals, which is coupled to at least one semiconductor laser serving as a pump light source, which is activated by an operating current, characterized in that an operating current source is provided, and produces a modulated operating current for the pump laser or lasers, where the modulation frequency of the operating current is above the reciprocal lifetime of the energy level of the laser-active substance, which amplifies the light signals when it decays.

An advantage of the invention consists in that it makes unnecessary the costly installation of optical isolators between the optical coupler and the semiconductor laser, immediately before the latter, to prevent the pump light from being reflected back into the semiconductor laser.

The frequency at which the operating current is modulated, is above the reciprocal lifetime of the excited energy level of the laser-active substance, e.g. erbium, which causes the amplification of the light signals to be transmitted. In this way, the fluctuations in the pump light amplitude are not "perceived" by the laser-active substance, i.e. the length of fiber acts as a low-pass filter for the varying component of the pump light signal.

Further advantageous configurations can be found in the subclaims.

BRIEF DESCRIPTION OF THE DRAWINGS

The following describes the invention in greater detail by means of drawings representing only one configuration, where.

DETAILED DESCRIPTION OF THE INVENTION

Figure 1:
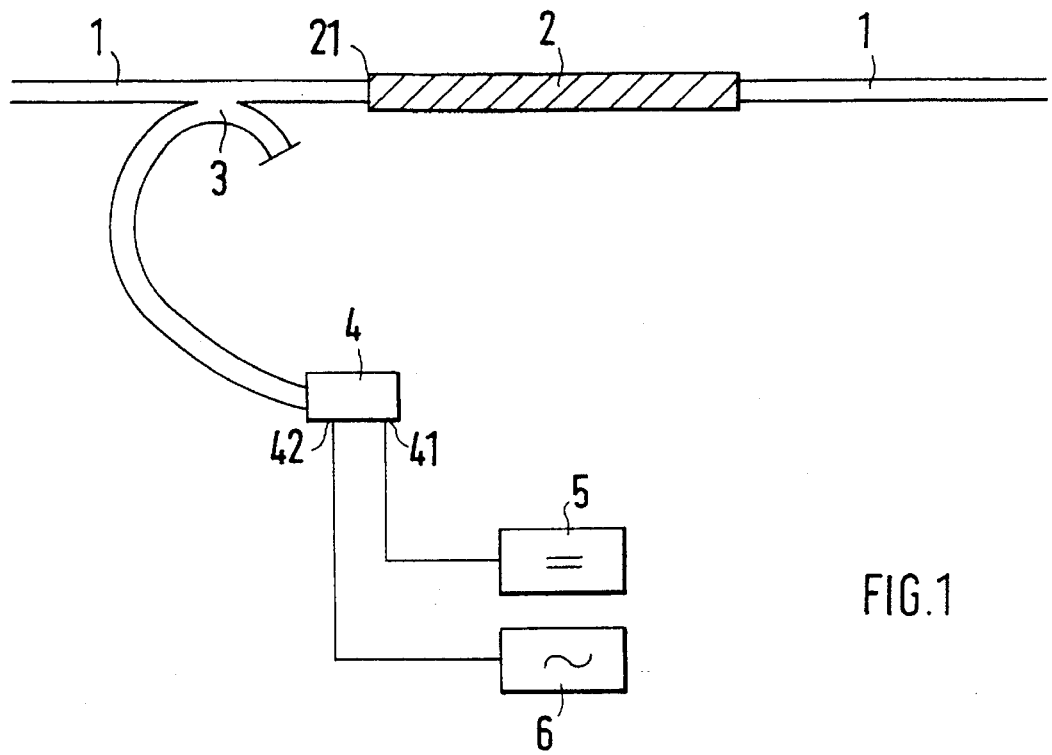
FIG. 1 shows an optical amplifier according to the invention with a single pump laser.

In FIG. 1, an optical amplifier is inserted into a light waveguide transmission path 1. It has a length of fiber 2, which is doped with a laser-active substance, e.g. erbium. Light signals are transmitted over the light waveguide transmission path 1, and amplified in the length of fiber 2. The light signals have a wavelength of $\lambda=1530–1570$ nm. One end 21 of the length of fiber 2 is connected to a semiconductor laser 4 by an optical coupler 3. The semiconductor laser 4 is, for example, an InGaAsP/InP-, an InGaAs/AlGaAs- or a GaAlAs/GaAs-laser, which emits at a wavelength in the range of $\lambda=750–870$ nm, $\lambda=960–1000$ nm or $\lambda=1460–1500$ nm. An electrical contact 41 connects it to a DC source 5. So far, the description of the optical amplifier in FIG. 1 matches the known types.

According to the invention, the operating current of the laser is not a DC current but a modulated current. For that purpose, the semiconductor laser 4 in the configuration in FIG. 1 has an electrical contact 42, which connects it to an AC source 6. The AC source 6 produces for example either a sinus-shaped or a square-shaped alternating current.

The AC source 6 produces an alternating current, which, together with the direct current from the DC source, forms the operating current of the semiconductor laser 4 (pump laser). In other words: the operating current is a direct current on which an alternating current has been superimposed, or: the operating current is a (periodically) modulated direct current.

Instead of an arrangement of DC source 5 and AC source 6, a modulatable DC source can also be used as the operating current source. Only the operating current must be modulated in some way.

The semiconductor laser 4 emits multi-mode pump light based on the alternating current, i.e. the modulated operating current. For example, the light from a semiconductor laser emitting at λ=1480 nm, which has only a few modes with direct current, is split by the alternating current portion into 20–30 modes, which have a mode spacing of 80 GHz.

The frequency of the AC, i.e. the modulation frequency of the operating current, is above the reciprocal lifetime of the excited, laser-active energy level of the erbium in fiber length 2. Since the lifetime of the energy level is in the millisecond range, the AC should be provided with a frequency in the lower megahertz range. This prevents the pump light frequency from modulating the light signals to be transmitted and amplified.

As mentioned in the beginning, there are fiber optic amplifiers with two pump lasers on each side of the amplifying length of fiber. The problem of back reflection of pump light into the pump laser can also be solved as indicated earlier, by operating the pump laser or lasers with an operating current which is a modulated direct current.

Figure 2:
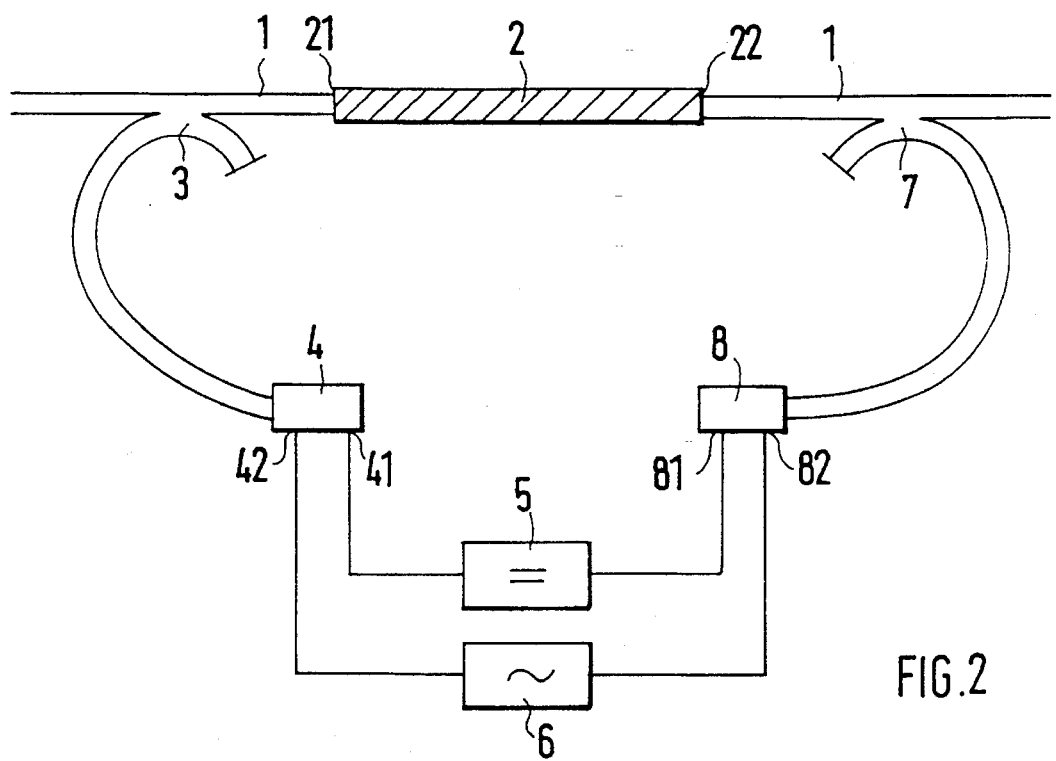
FIG. 2 shows an amplifier according to the invention with two pump lasers.

FIG. 2 shows a configuration example of such a solution. The left portion of the figure corresponds exactly to FIG. 1, therefore this portion does not need to be explained again. The second end 22 of the length of fiber is connected to a second semiconductor laser 8 by an optical coupler 7. The laser has two electrical contacts 81 and 82, which connect it to the DC source 5 or the AC source 6.

Instead of the single AC source 6, each semiconductor laser 4 and 8 may have its own AC source. The same applies to DC source 5.

An operating current source of the type shown in FIG. 2, or by other means, as explained above for the instance of a single pump laser, also provides modulation of the operating current in the case of two pump lasers.

Still, a reciprocal interference effect of the pump lasers cannot be excluded. That is why optical isolators are presently placed before the pump lasers. The invention permits omitting the isolators, when the two pump lasers are alternately switched on and off, so that only one is active and the other inactive. This represents a modulation of the operating current of each of the two pump lasers, which prevents reciprocal interference of the semiconductor lasers 4 and 8. The multi-modicity of the lasers is automatically ensured by the switching, if the switching frequency is sufficiently high. If it is high enough for the purpose of multi-modicity of the pump laser, it is also practically higher than the reciprocal lifetime of the excited energy level of the laser-active substance in the length of fiber 2, which is required in all instances, as explained earlier.

Although with two alternately switched-on pump lasers, the average pump output in the length of fiber 2 is only as large as that of a single, permanently operating pump laser, the following advantages are found: bidirectional pumping simultaneously achieves both a lower noise factor and a higher output. In addition, each laser is only used half of the time, which has a positive effect on reliability.

For example, to supply both pump lasers with alternately switched-on operating current, an HF generator with two inverted outlets can be used, one of which always conducts current while the other conducts no current.

To switch the pump lasers on and off, it is unimportant whether the operating current of one pump laser is fully switched off during its idle phase, or is only lowered under the pump laser's threshold current.

The alternate on and off switching of the two pump lasers can also be achieved with a device that supplies a square-wave AC alternately to one and the other pump laser through a switch.

Regardless of how it is produced, the operating current of a pump laser may be a square-shaped DC that is turned on and off. However, it can also be a square-shaped DC that is turned on and off, on which AC is permanently superimposed, or only during the on-phase of the pump laser, so that a modulated DC flows as the operating current through the pump laser during the on-phase itself. This is particularly necessary when the switching frequency of the alternate on-switching of the two lasers is not high enough to make each of the pump lasers multi-modal during its on-phase. In that instance, the DC modulation supplies the multi-modicity during the on-phase.

We claim:

1. An optical amplifier comprising:

a length of fiber (2) that contains a laser-active substance having an energy level with a lifetime for amplifying light signals when it decays;

at least one semiconductor laser (4, 8) being coupled to said length of fiber (2), for providing pump light, characterized in that an operating current source (5, 6) provides a modulated operating current signal to said at least one semiconductor laser (4, 8), the modulated operating current signal having a substantially constant modulation frequency which represents absolutely no information and which is greater than a reciprocal of the lifetime of the energy level of the laser-active substance, so the light signals to be amplified are not modulated.

2. An optical amplifier according to claim 1, characterized in that the operating current source contains a DC source (5) and an AC source (6), whose output currents together form the operating current.

3. An optical amplifier according to claim 1, with two semiconductor lasers (4, 8), each connected as a pump light source to one end of the length of fiber (2), characterized in that the operating current source supplies current to the two semiconductor lasers in such a way, that the two semiconductor lasers are alternately switched on and off.

4. An optical amplifier according to claim 3, characterized in that the operating current for each of the two alternately switched-on semiconductor lasers (4, 8), is a DC current that is switched on and off at the named frequency, and is thereby modulated.

5. An optical amplifier according to claim 3, characterized in that the operating current for each of the two alternately switched-on semiconductor lasers (4, 8) is a DC current that is switched on and off, which is modulated at the named frequency.

6. An optical amplifier according to claim 1, wherein the modulated operating current signal includes a AC current portion, and said at least one semiconductor laser (4, 8) emits multi-mode pump light with a wavelength of about 1480 nanometers, which is split by the AC current portion into 20–30 modes, each mode having a spacing of 80 gigahertz, the multimode pump light being substantially insensitive to feedback.

7. An optical amplifier according to claim 6, wherein the reciprocal lifetime of the energy level of the laser active substance is in a millisecond range, and the AC current portion has a frequency in a low megahertz range.

8. An optical amplifier according to claim 6, wherein the light signal has a wavelength in a range of between 1530–1570 nanometers.

9. An optical amplifier according to claim 8, wherein said at least one semiconductor laser (4, 8) provides multi-mode pump light having a wavelength in a range of 750–870 nanometers.

10. An optical amplifier according to claim 8, wherein said at least one semiconductor laser (4, 8) provides multi-mode pump light having a wavelength in a range of 960–1000 nanometers.

11. An optical amplifier according to claim 8, wherein said at least one semiconductor laser (4, 8) provides multi-mode pump light having a wavelength in a range of 1460–1500 nanometers.

12. An optical amplifier comprising:

a length of fiber (2) that contains a laser-active substance having an energy level with a lifetime for amplifying light signals when it decays;

at least one semiconductor laser (4,8) being coupled to said length of fiber (2), for providing pump light, characterized in that an operating current source (5, 6) provides a modulated operating current signal having a substantially constant modulation frequency that represents absolutely no information to said at least one semiconductor laser (4,8) and that is greater than a reciprocal of the lifetime of the energy level of the laser-active substance, so the light signals to be amplified are not modulated, wherein the modulated operating current signal includes a AC current portion, and said at least one semiconductor laser (4, 8) emits multi-mode pump light with a wavelength of about 1480 nanometers, which is split by the AC current portion into 20–30 modes, each mode having a spacing of 80 gigahertz, the multimode pump light being substantially insensitive to feedback.

13. An optical amplifier according to claim 12, wherein said at least one semiconductor laser (4, 8) provides multi-mode pump light having a wavelength in a range of 750–870 nanometers.

14. An optical amplifier according to claim 12, wherein said at least one semiconductor laser (4, 8) provides multi-mode pump light having a wavelength in a range of 960–1000 nanometers.

15. An optical amplifier according to claim 12, wherein said at least one semiconductor laser (4, 8) provides multi-mode pump light having a wavelength in a range of 1460–1500 nanometers.

16. An optical amplifier comprising:

a length of fiber (2) that contains a laser-active substance having an energy level with a lifetime for amplifying light signals when it decays;

at least one semiconductor laser (4, 8) being coupled to said length of fiber (2), for providing pump light, characterized in that an operating current source (5, 6) provides a modulated operating current to said at least one semiconductor laser (4, 8), the modulated operating current having a modulation frequency that causes said at least one semiconductor laser (4, 8) to provide multi-mode pump light thereby making it substantially insensitive to feedback, and the modulation frequency being greater than a reciprocal of the lifetime of the energy level of the laser-active substance, so the light signals to be amplified are not modulated.

* * * * *